Patented Nov. 2, 1937

2,097,464

UNITED STATES PATENT OFFICE 2,097,464

HAZE FREE CELLULOSE ACETATE AND ITS PREPARATION

Carl J. Malm, Rochester, N. Y., assignor, by mesne assignments, to Eastman Kodak Company, Jersey City, N. J., a corporation of New Jersey No Drawing. Application April 25, 1935, Serial No. 18,215

8 Claims. (Cl. 260—101)

This invention relates to the preparation of cellulose acetate of excellent clarity by adding a small amount of propionic, or butyric, acid or anhydride to the reaction mixture.

The haze which may be found in cellulose acetate solutions is of two types, (1) that due to the presence of insoluble metal salts which originate from the ash content of the cellulose, from impurities in the acetic acid or anhydride or from corrosion of the esterification equipment and (2) that due to insoluble organic material.

The former type of haze can be partly avoided by using non-corrosive equipment as described in my U. S. Patent No. 1,840,404 or the metal salts formed may be removed by adding hydrochloric acid to the solution of the acetate in its reaction mixture as described in my U. S. Patent No. 1,878,954.

It is believed that the second type of haze is due to the presence of small amounts of the triacetate of a cellulose which has not been depolymerized sufficiently, to render the ester thereof soluble in acetic acid.

I have found that although an insufficiently depolymerized cellulose when fully acetylated resists solution, a small content of propionyl or butyryl in such a cellulose acetate will contribute to its solubility in acetic acid and thus result in a clear product.

To assure a small content of propionyl or butyryl in the cellulose acetate, a small proportion of either the acid or the anhydride or both is introduced into the esterification mixture. The percentage of propionyl or butyryl which is necessary to eliminate haze depends upon the degree to which the least depolymerized portion of the cellulose, has been depolymerized, the less the degree of depolymerization the more propionyl or butyryl is needed. Usually a propionyl or butyryl content of 1% is sufficient but in some cases it is necessary to introduce up to 6% of propionyl or butyryl in the cellulose acetate to obtain a clear solution.

One factor which might hinder the necessary degree of depolymerization of all of the cellulose is the low temperature of the reaction mixture next to the cooling jacket. This is especially true in large scale operations as large scale apparatus has a correspondingly smaller cooling surface than small scale apparatus and a lower temperature of the fluid in the cooling jacket is necessary in order to control the reaction. This lower temperature causes haze formation to a higher degree, which haze is distributed by the mixing device throughout the esterification mixture. In such a case where the degree of depolymerization of some of the cellulose might be slight, a slightly larger proportion of the higher acyl groups would be desirable.

The percentage of propionyl or butyryl desired in the final product will determine the percentage of higher to total acyl groups to employ in the esterification bath. For instance, where a content of about 1% propionyl or butyryl in the cellulose acetate is desired, the percentage of propionyl or butyryl which should be present in the esterification bath based on the total acyl therein should be at least 3% and preferably in the vicinity of 5%. If a higher percentage of propionyl or butyryl is desired, for instance for the reasons pointed out above, a greater percentage of propionyl or butyryl (based on total acyl) is employed in the esterification bath. If approximately 3% of propionyl or butyryl in the cellulose acetate is desired, the esterification bath should contain 12-15% of propionyl or butyryl based on the total acyl present. If approximately 6% of propionyl or butyryl is desired in the cellulose acetate, the presence of 20%–25% of propionyl or butyryl based on total acyl in the bath is required. Therefore the presence of about 3%–25% of propionyl or butyryl to total acyl in the esterification bath is contemplated by my invention, although in almost every case the presence of about 3%–12% will be sufficient to prevent haze.

The following examples illustrate my invention:

Example I 450 lbs. of cotton cellulose was introduced into a mixture of 2130 lbs. of acetic acid and 320 lbs. of propionic acid, and the whole was allowed to stand for 4 hours at approximately 100° F. 1350 lbs. of 85% acetic anhydride was added and the mixture was cooled to approximately 46° F. whereupon a solution of 32 lbs. of sulfuric acid in 700 lbs. of acetic acid was added. The temperature was allowed to rise to approximately 100° F. over a period of 1½ hours at which temperature it was maintained until a brilliant dope, free from grain, was obtained.

The ester formed was then hydrolyzed by adding 1,000 lbs. of 50% acetic acid to the dope and allowing to stand for 70 hours at 100° F. 20 lbs. of 35% hydrochloric acid diluted with 200 lbs. of 50% acetic acid was added to the solution and one-half hour later the cellulose acetate was separated out by precipitating into 28% acetic acid.

The solution before its precipitation had a turbidity of 30 parts per million compared with a turbidity of 120 parts per million for a pure cellulose acetate at the same stage in an identical process except that the use of propionic acid is dispensed with.

The turbidity in each case was determined by comparison with a standard turbidity solution standardized by the U. S. Bureau of Standards.

Example II

The process of the above example was repeated except that 640 lbs. of propionic acid was employed and the temperature was allowed to rise only to a maximum of 90° F. at which it was maintained until completion of the acetylation. The solution before its precipitation showed a turbidity of 20 parts per million while the product made by an identical process except with the omission of the propionic acid had a turbidity of 106 parts per million. The product contained 3.8% propionyl.

Example III

The process of Example II was repeated except that butyric acid was employed instead of propionic acid. The turbidity of the dope was 35 parts per million and the ester obtained contained 3.7% butyryl.

The cellulose acetates prepared in accordance with the present invention show distinct advantages over ordinary cellulose acetate for various purposes where clarity or homogeneity is especially desirable. For instance, at the present time non-shatterable or safety glass comprises a sheet of cellulose acetate sandwiched between two sheets of glass. It is desirable that this intermediate layer have a high clarity and the esters prepared in accordance with the present invention are eminently suited for use in this connection.

It is desirable that artificial silk have uniform strength over its entire length. Due to the good homogeneity of the esters prepared in accordance with the present invention an artificial silk prepared therefrom exhibits better strength than that prepared from ordinary cellulose acetate.

The esters prepared in accordance with the present invention may also be employed for sheeting, for protective overcoatings or any other use to which cellulose acetate is put at the present time.

In order to obtain a fully acylated cellulose it is necessary, theoretically, that approximately 1.83 parts of acetic anhydride or a chemically equivalent amount of lower fatty acid anhydride be present for every part of cellulose to satisfy the three hydroxyl groups of a $C_6$ unit of cellulose. In addition to the amount of anhydride necessary for esterification there must also be present additional anhydride to combine with any water which may be present. The water which converts anhydride into the corresponding acid may come from the moisture content of the cellulose and the small percentage of moisture which may be present in the organic acid employed. In practice it is usually necessary to have present, at least, two parts of acetic anhydride and preferably more in the preparation of acetyl cellulose to satisfy the esterifiable hydroxyl groups of the cellulose. The minimum of anhydride which is necessary obviously depends on the amount of moisture present. In the examples 2½ parts of acetic anhydride is employed for every part of cellulose. The applicant has found this proportion quite satisfactory to give a substantially fully acylated cellulose under the esterification conditions described and claimed.

I claim:

1. An acetyl cellulose having a turbidity in its esterification mixture of not more than 35 parts per million and having the general properties of a product produced by the process in which cellulose is presoaked in a bath essentially consisting of acetic acid and then substantially fully acylated in a bath 3–25% of the acyl content of which is fatty acid groups of 3–4 carbon atoms.

2. An acetyl cellulose having a turbidity in its esterification mixture of not more than 35 parts per million and having the general properties of a product produced by the process in which cellulose is presoaked in a bath essentially consisting of acetic acid and then substantially fully acylated in a bath 3–12% of the acyl content of which is fatty acid groups of 3–4 carbon atoms.

3. The process of preparing a haze-free acetyl cellulose containing a small amount of acyl groups of 3–4 carbon atoms which comprises presoaking cellulose in a bath essentially consisting of fatty acid of 2–4 atoms as the only acid therein, acetic acid being predominant and then acetylating it in a bath containing sufficient lower fatty acid anhydride to substantially completely acylate the cellulose in which bath 3 to 25% of the acyl content is fatty acid groups of 3–4 carbon atoms.

4. The process of preparing a haze-free acetyl cellulose containing a small amount of acyl groups of 3–4 carbon atoms which comprises presoaking cellulose in a bath essentially consisting of fatty acid of 2–4 atoms as the only acid therein, acetic acid being predominant and then acetylating it in a bath containing sufficient lower fatty acid anhydride to substantially completely acylate the cellulose in which bath 3 to 12% of the acyl content is fatty acid groups of 3–4 carbon atoms.

5. The process of preparing a haze-free acetyl cellulose containing a small amount of propionyl which comprises presoaking cellulose in a bath essentially consisting of fatty acid of 2–4 carbon atoms as the only acid therein, acetic acid being predominant and then acetylating it in a bath containing sufficient lower fatty acid anhydride to substantially completely acylate the cellulose in which bath 3 to 25% of the acyl content is propionyl.

6. The process of preparing a haze-free acetyl cellulose containing a small amount of butyryl which comprises presoaking cellulose in a bath essentially consisting of fatty acid of 2–4 carbon atoms as the only acid therein, acetic acid being predominant and then acetylating it in a bath containing sufficient lower fatty acid anhydride to substantially completely acylate the cellulose in which bath 3 to 25% of the acyl content is butyryl.

7. The process of preparing a haze-free acetyl cellulose containing a small amount of acyl groups of 3–4 carbon atoms which comprises presoaking cellulose in a bath essentially consisting of fatty acid of 2–4 carbon atoms as the only acid therein, acetic acid predominant and then acetylating in the bath containing sufficient lower fatty acid anhydride to substantially completely acylate the cellulose in which bath 5% of the acyl content is fatty acid groups of 3–4 carbon atoms.

8. The process of preparing a haze-free acetyl cellulose containing a small amount of acyl groups of 3–4 carbon atoms which comprises presoaking cellulose in a bath essentially consisting of fatty acid of 2–4 carbon atoms as the only acid therein, acetic acid being predominant, then acetylating it in a bath containing sufficient lower fatty acid anhydride to substantially completely acylate the cellulose in which bath 3–25% of the acyl content is fatty acid groups of 3–4 carbon atoms and then adding dilute aqueous acetic acid thereto and hydrolyzing the product to acetone solubility.

CARL J. MALM.